(12) United States Patent
Montero et al.

(10) Patent No.: US 9,952,636 B2
(45) Date of Patent: *Apr. 24, 2018

(54) SYSTEMS AND METHODS FOR USER MODIFICATION OF COOLING DEVICE RESPONSE IN INFORMATION HANDLING SYSTEMS

(71) Applicant: Dell Products LP, Round Rock, TX (US)

(72) Inventors: Adolfo S. Montero, Pflugerville, TX (US); Kevin B. Locke, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/205,488

(22) Filed: Jul. 8, 2016

(65) Prior Publication Data

US 2016/0320814 A1 Nov. 3, 2016

Related U.S. Application Data

(63) Continuation of application No. 14/154,840, filed on Jan. 14, 2014, now Pat. No. 9,405,301.

(51) Int. Cl.
| | |
|---|---|
| G05D 23/00 | (2006.01) |
| G06F 1/20 | (2006.01) |
| G06F 3/0484 | (2013.01) |
| G05D 23/19 | (2006.01) |
| G06F 3/0481 | (2013.01) |

(52) U.S. Cl.
CPC ............ *G06F 1/20* (2013.01); *G05D 23/1902* (2013.01); *G06F 1/206* (2013.01); *G06F 3/0481* (2013.01); *G06F 3/04847* (2013.01); *G05B 2219/43074* (2013.01)

(58) Field of Classification Search
CPC ........................................................ G06F 1/20
USPC ................................... 700/275–278, 300
See application file for complete search history.

(56) References Cited

U.S. PATENT DOCUMENTS

| | | |
|---|---|---|
| 4,300,037 A | 11/1981 | Padden |
| 4,949,578 A | 8/1990 | Harpster |
| 5,926,386 A | 7/1999 | Ott et al. |
| 6,340,874 B1 | 1/2002 | Vladimir |

(Continued)

OTHER PUBLICATIONS

Sarno et al, "Integration, cooling and packaging issues for aerospace equipments", ACM, pp. 1225-1230, 2010.*

(Continued)

*Primary Examiner* — Anil Khatri
(74) *Attorney, Agent, or Firm* — Egan Peterman Enders Huston

(57) ABSTRACT

Systems and methods are provided that may be implemented for facilitating user modification of cooling device speed response to sensed temperature in information handling systems. The disclosed systems and methods may be implemented to allow an information handling system user to modify how one or more individual cooling device/s respond to device speed control values specified by stored device speed control information without requiring the user to change the identity or pre-defined device speed values of the device speed control information with which the information system is currently operating.

20 Claims, 6 Drawing Sheets

(56) References Cited

U.S. PATENT DOCUMENTS

| | | | |
|---|---|---|---|
| 6,487,463 B1* | 11/2002 | Stepp, III | G05D 23/1934 700/299 |
| 6,996,441 B1* | 2/2006 | Tobias | G05D 23/1919 165/104.33 |
| 7,130,719 B2 | 10/2006 | Ehlers et al. | |
| 7,300,821 B2* | 11/2007 | Farrar | G01R 31/2817 257/E21.499 |
| 7,310,737 B2 | 12/2007 | Patel et al. | |
| 7,370,242 B2* | 5/2008 | Chen | G06F 1/20 700/300 |
| 7,394,217 B2 | 7/2008 | Marando | |
| 7,657,347 B2* | 2/2010 | Campbell | G01F 1/6965 137/340 |
| 7,742,844 B2* | 6/2010 | Coxe, III | G06F 1/20 165/200 |
| 7,809,478 B2* | 10/2010 | Siba | G06F 1/206 361/600 |
| 7,903,409 B2* | 3/2011 | Patel | G06F 1/20 165/80.2 |
| 7,987,024 B2 | 7/2011 | Tunks et al. | |
| 8,046,113 B2* | 10/2011 | Sharma | G05D 23/2225 62/259.2 |
| 8,082,069 B2 | 12/2011 | Koshiyama | |
| 8,280,559 B2 | 10/2012 | Herman et al. | |
| 8,405,975 B2* | 3/2013 | Helberg | G06F 1/1632 165/104.33 |
| 8,467,912 B2 | 6/2013 | Zwinger et al. | |
| 8,538,584 B2* | 9/2013 | Pandey | G05D 23/00 700/275 |
| 8,560,126 B2 | 10/2013 | Vass et al. | |
| 8,700,217 B2 | 4/2014 | Lee | |
| 8,706,314 B2* | 4/2014 | Lewis | G05D 23/19 700/276 |
| 8,718,835 B2 | 5/2014 | Sankar et al. | |
| 8,787,022 B2* | 7/2014 | Moriai | G06F 1/20 174/260 |
| 8,949,630 B2* | 2/2015 | Peterson | G06F 1/26 700/12 |
| 9,423,161 B2* | 8/2016 | Ludwig | F25B 21/04 |
| 9,746,896 B1* | 8/2017 | Lewkow | G06F 1/3203 |
| 9,811,126 B2* | 11/2017 | Chainer | G06F 1/20 |
| 2003/0019984 A1 | 1/2003 | Chu et al. | |
| 2004/0264124 A1 | 12/2004 | Patel et al. | |
| 2005/0006085 A1 | 1/2005 | Nelson | |
| 2005/0071442 A1 | 3/2005 | Becker et al. | |
| 2005/0128700 A1 | 6/2005 | Alperin et al. | |
| 2009/0099696 A1 | 4/2009 | Artman et al. | |
| 2010/0087965 A1 | 4/2010 | Tunks et al. | |
| 2010/0205469 A1 | 8/2010 | McCarthy et al. | |
| 2011/0176275 A1 | 7/2011 | Sato | |
| 2012/0016533 A1 | 1/2012 | Lim et al. | |
| 2012/0218707 A1 | 8/2012 | Chan | |
| 2013/0101389 A1 | 4/2013 | Chou et al. | |
| 2013/0318371 A1 | 11/2013 | Hormuth | |
| 2014/0032011 A1 | 1/2014 | Artman et al. | |
| 2015/0198957 A1 | 7/2015 | Montero et al. | |
| 2017/0017281 A1 | 1/2017 | Artman et al. | |

OTHER PUBLICATIONS

Rabbani et al, The SPOT* System for Flexible Personal Heating and Cooling, ACM, pp. 209-210, 2015.*

Yang et al, "Living with an Intelligent Thermostat: Advanced Control for Heating and Cooling Systems", ACM, pp. 1102-1107, 2012.*

Xie et al, "Dynamic Thermal Management in Mobile Devices Considering the Thermal Coupling between Battery and Application Processor", IEEE, pp. 242-247, 2013.*

Ercan et al, "Determining Fundamental Heat Dissipation Bounds for Transistor-Based Nanocomputing Paradigms", IEEE, pp. 169-174, 2011.*

McGibney et al, "A Methodology for Sensor Modeling and Placement Optimization to Support Temperature Monitoring", ACM, pp. 88-90, 2012.*

Long et al, "A Framework for Optimizing Thermoelectric Active Cooling Systems", ACM, pp. 591-596, 2010.*

Lin et al, "Conserving cooling and computing power by distributing workloads in data centers", ACM, pp. 232-239, 2016.*

Pereira, "Information Handling System Storage Device Management Information Access", U.S. Appl. No. 13/285,844, filed Oct. 31, 2011, 15 pgs.

Dell, Press Release, Dell Unleashes The World's Most Powerful 15.6 Inch Mobile Workstation, Mar. 9, 2010, 2 pgs.

Dell, Press Release, Dell Unveils Next Generation Precision M4500 Mobile Workstation, Mar. 9, 2010, 3 pgs.

Long et al., "A Framework for Optimizing Thermoelectric Active Cooling Systems", ACM, 2010, 5 pgs.

Rempel et al., "Optimization of Passive Cooling Control Thresholds With GenOpt and EnergyPlus", ACM, 2015, 8 pgs.

Hatano et al., "A Cooling and Heat-Retention System Actuated by Peltier Device Considering Fan-motor Control", IEEE, 2014, 6 pgs.

Folcarelli et al., "An Opportunistic Reconfiguration Strategy for Environmentally Powered Devices", ACM, 2006, 6 pgs.

* cited by examiner

SYSTEMS AND METHODS FOR USER MODIFICATION OF COOLING DEVICE RESPONSE IN INFORMATION HANDLING SYSTEMS

This application is a continuation of pending U.S. patent application Ser. No. 14/154,840, filed on Jan. 14, 2014 and entitled "Systems And Methods For User Modification Of Cooling Device Response In Information Handling Systems" the entire disclosure of which is incorporated herein by reference.

FIELD OF THE INVENTION

This invention relates generally to information handling systems and, more particularly, to cooling fans of information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cooling fans are typically employed within the chassis enclosure of an information handling system to cool components operating within the information handling system chassis enclosure. Certain types of information handling systems, such as precision workstations, may employ multiple different cooling fans with a different cooling fan unit positioned to cool a different component type within the chassis enclosure of the information handling system, such as CPU, memory, hard disk drive (HDD), PCI cards and power supply.

In the past, thermal tables have been provided in system memory that specify fan speed RPM values for each respective cooling fan of an information handling system at a given temperature (or alternatively at a given range of sensed temperature) within the chassis enclosure. The specified fan speed (e.g., RPM) values and baseline temperature response of such a thermal table are pre-defined based on thermal engineering and default thermal loadings for different system components, and are selected to help ensure sufficient cooling of the components of a given default system configuration that includes a specific default number and type/s of system components. As the sensed operating temperature within the system chassis increases or decreases, the fan speed of each of the given system cooling fans is automatically increased or decreased according to a pre-defined linear (X-Y) relationship of the thermal table that specifies increasing fan speed with increasing temperature. For some notebook computers, the pre-defined fan speed values of a thermal table are specified as temperature ranges, such that as the sensed operating temperature within the system chassis increases from a value lying within a first lower pre-defined temperature range of the thermal table to a value lying within a second higher pre-defined temperature range of the thermal table, the fan speed of each of the given system cooling fans is automatically increased from a respective pre-defined lower fan speed corresponding to the lower temperature range to a respective pre-defined higher fan speed specified corresponding to the higher temperature range. In either case, when sensed system temperature increases from a lower pre-defined temperature to a higher pre-defined temperature range, the speeds of all system cooling fans increase according to the pre-defined thermal table cooling fan speed values.

In an attempt to allow a user to control cooling fan speed to compensate for increased thermal loads that are higher than the default thermal loads of a default system configuration, user-selectable thermal tables (USTTs) have been employed. Such a USTT contains a finite number of different pre-defined user-selectable fan speed modes expressed as respective different thermal tables that each define a different fan speed policy as a function of sensed temperature range. Each of these user-selectable modes includes a different set of specified fan speed values for the individual cooling fans of the system as a function of sensed system temperature range. During system setup (at the time of system boot prior to booting the operating system), a system user can select a different (non-default) fan speed mode from the USTT in order to increase or decrease the cooling fan speed response for all system cooling fans across the board as a function of sensed temperature range. For example, in a given information handling system configuration having a heavy Peripheral Component Interconnect (PCI) card thermal load (i.e., that is greater than the default system PCI card thermal load), a user may choose a more aggressive (or higher speed) pre-defined USTT mode that increases the cooling fan speed (RPM) of all system cooling fans for each given sensed temperature range. However, selecting a USTT fan speed mode that results in higher pre-defined fan speeds for all system cooling fans at each given temperature range causes system acoustics to suffer due to loud cooling fan noise from all system cooling fans operating at a higher speed.

SUMMARY OF THE INVENTION

Disclosed herein are systems and methods that may be implemented for facilitating user modification of system cooling device response to sensed temperature in information handling systems, such as cooling fans and/or liquid coolant pumps for cooling one or more components of an information handling system. The disclosed systems and methods may be implemented to allow an information handling system user to modify how one or more individual cooling device/s respond to device speed control values (or device fluid flow rate values) specified by stored device speed control information without requiring the user to change the identity or pre-defined device speed values of the device speed control information with which the information system is currently operating. The disclosed systems and methods may be implemented in conjunction with various USTT modes on a given information handling system, or may be implemented independently (or without) the presence of any USTT modes on the same information handling system.

The disclosed systems and methods may be advantageously implemented in one embodiment to allow a user to choose a particular system cooling device or devices (e.g., such as PCI cooling fan/s or PCI cooling pump/s) for higher RPM response to meet particular component cooling requirements without impacting the RPM response of the other system cooling devices. This in contrast to conventional USTT methodology in which the only option for the user is to move to a USTT mode with higher RPMs impacting acoustics for all fans.

In one embodiment, an information handling system user to modify how one or more individual cooling device/s (e.g., cooling fan/s or cooling pump/s) respond to device speed control values specified by device speed control information, such as a given pre-defined thermal table or a given USTT device speed mode (or policy), e.g., in one embodiment without modifying device speed response of the other system cooling devices to device speed values specified by device speed control information. Thus, in one exemplary embodiment, a user may be allowed to customize or otherwise vary the character of the device speed response of one or more individual system cooling devices to fit specific system hardware cooling requirements, e.g., as these requirements change over time due to changes in hardware configuration. In this regard, a user may be allowed to match changes in system temperature without requiring the user to change the identity of the system thermal table or currently-selected USTT device speed mode with which the information system is currently operating. In other words, a user may be given the ability to change individual cooling device speed response as a function of temperature within a given thermal table or USTT device speed mode, e.g., without requiring the number of USTT modes to be incremented in order to give the user a wider range of device policies to choose from.

In one exemplary embodiment, user-configurable device speed modifier information (e.g., such as thermal curve offset or a multiplier value that may be infinitely or substantially infinitely variable) may be entered by a user to cause one or more selected cooling device/s of the system to run at modified higher device speeds (RPMs) than are specified by device speed control information such as pre-defined (e.g., default) baseline nominal device speed values for the selected cooling device/s that are defined in the thermal table of a currently-selected USTT thermal mode for any given sensed operating temperature value. In one embodiment, it is possible that each cooling device location of an information handling system may have its own user-configurable device speed modifier to allow a user to "fine tune" the individual cooling device responses across components of the entire system (e.g., in the case of multiple individual cooling device locations having devices dedicated for CPUs and other system processing devices, RAM or NVRAM memory devices, magnetic and optical media devices such as hard disk drives (HDDs), PCI cards, power supply components, etc.). However, in other embodiments, the disclosed systems and methods may be implemented to allow a user to modify cooling device speed response for information handling systems having a single cooling device, or to allow a user to modify cooling device speed response of all cooling devices in a simultaneous and coordinated manner for information handling systems having multiple cooling devices.

In one exemplary embodiment, a range of user-configurable device speed modifier values may be defined that result in modified cooling device speeds that are always higher than the respective non-modified (e.g., default) device speed values specified by device speed control information. In this case, the cooling device speeds for the selected cooling device/s of an information handling system may continue to run at modified device speeds that are higher than, but based at least in part upon, the device speed values specified by device speed control information such as a thermal table for the currently-selected USTT thermal mode at the current sensed operating temperature. Moreover, any remaining (non-selected) cooling devices of the same information handling system may continue to operate at respective device speeds that are non-modified and equal to the corresponding device speed values that are specified by the device speed control information. Examples of such non-modified device speed values include device speed values that are defined in the thermal table of a currently-selected USTT thermal mode for given sensed operating temperatures or temperature ranges.

Any suitable type of user interface may be implemented to allow a user to input device speed modifier information to modify cooling device speed response in an information handling system. In one exemplary embodiment, an intuitive user interface may be provided that allows a user to enter or type in numerical values and/or otherwise input or select particular device speed modifiers using keyboard keys for one or more individual cooling devices of an information handling system. In another exemplary embodiment, user-manipulable graphical elements of an intuitive graphical user interface (GUI) may be employed to allow a user to input device speed modifier information. Examples include GUI pull down menus, GUI slider bars, manipulable GUI curves, etc. Using such GUI-based device speed modification control advantageously allows even a causal or non-technical computer user to easily visualize and intuitively control the modification of device speed response without the need to understand and change stored pre-defined device speed control values within the existing device speed control information. In one particular exemplary embodiment, a setup field may be added to system BIOS that allows a user to change or otherwise specify a device speed modifier for one or more individual system cooling devices during system boot or start up.

In one respect, disclosed herein is an information handling system, including: a chassis enclosure; one or more heat generating components contained within the chassis enclosure; one or more temperature sensors configured to sense at least one of fluid temperature within the chassis enclosure, temperature of at least one of the heat generating components, or a combination thereof; one or more variable speed cooling devices configured to provide different flow rates of cooling fluid within the chassis enclosure to cool the heat generating components; persistent storage including device speed control information stored thereon, the device speed control information representing a pre-defined relationship between device speed control values and the sensed temperature reported by at least one of the temperature sensors; and at least one processing device configured to receive values of sensed temperature from each of the temperature sensors, and to provide control signals to control device speed of each of the cooling devices. The processing device may be configured to access the device speed control information stored on the persistent storage and to control device speed response of each of the cooling devices based on the pre-defined relationship between values of cooling device speed and the current sensed temperature defined by the device speed control information. The processing device may be further configured to receive user-configurable device speed modifier information entered by a user of the information handling system, and to modify the device speed response of each of the cooling devices to the device speed control values specified by the stored device speed control information based on the user-configurable device speed modifier information by applying the user-configurable device speed modifier information to the stored device speed control values specified by the stored device speed control information at the current sensed temperature without changing the pre-defined relationship between values of cooling device speed and the current sensed temperature defined by the device speed control information.

In another respect, disclosed herein is a method for modifying cooling device response in an information handling system, including: providing an information handling system including: a chassis enclosure, one or more heat generating components contained within the chassis enclosure, one or more variable speed cooling devices configured to provide different flow rates of cooling fluid within the chassis enclosure to cool the heat generating components, at least one processing device, and persistent storage including device speed control information stored thereon, the device speed control information representing a pre-defined relationship between device speed control values and the sensed temperature reported by at least one of the temperature sensors. The method may also include: sensing at least one of fluid temperature within the chassis enclosure, temperature of at least one of the heat generating components, or a combination thereof; and using the at least one processing device to: access the device speed control information stored on the persistent storage, control device speed response of each of the cooling devices based on the pre-defined relationship between values of cooling device speed and the current sensed temperature defined by the device speed control information, receive user-configurable device speed modifier information entered by a user of the information handling system, and modify the device speed response of each of the cooling devices to the device speed control values specified by the stored device speed control information based on the user-configurable device speed modifier information by applying the user-configurable device speed modifier information to the stored device speed control values specified by the stored device speed control information at the current sensed temperature without changing the pre-defined relationship between values of cooling device speed and the current sensed temperature defined by the device speed control information.

DESCRIPTION OF ILLUSTRATIVE EMBODIMENTS

Figure 1:
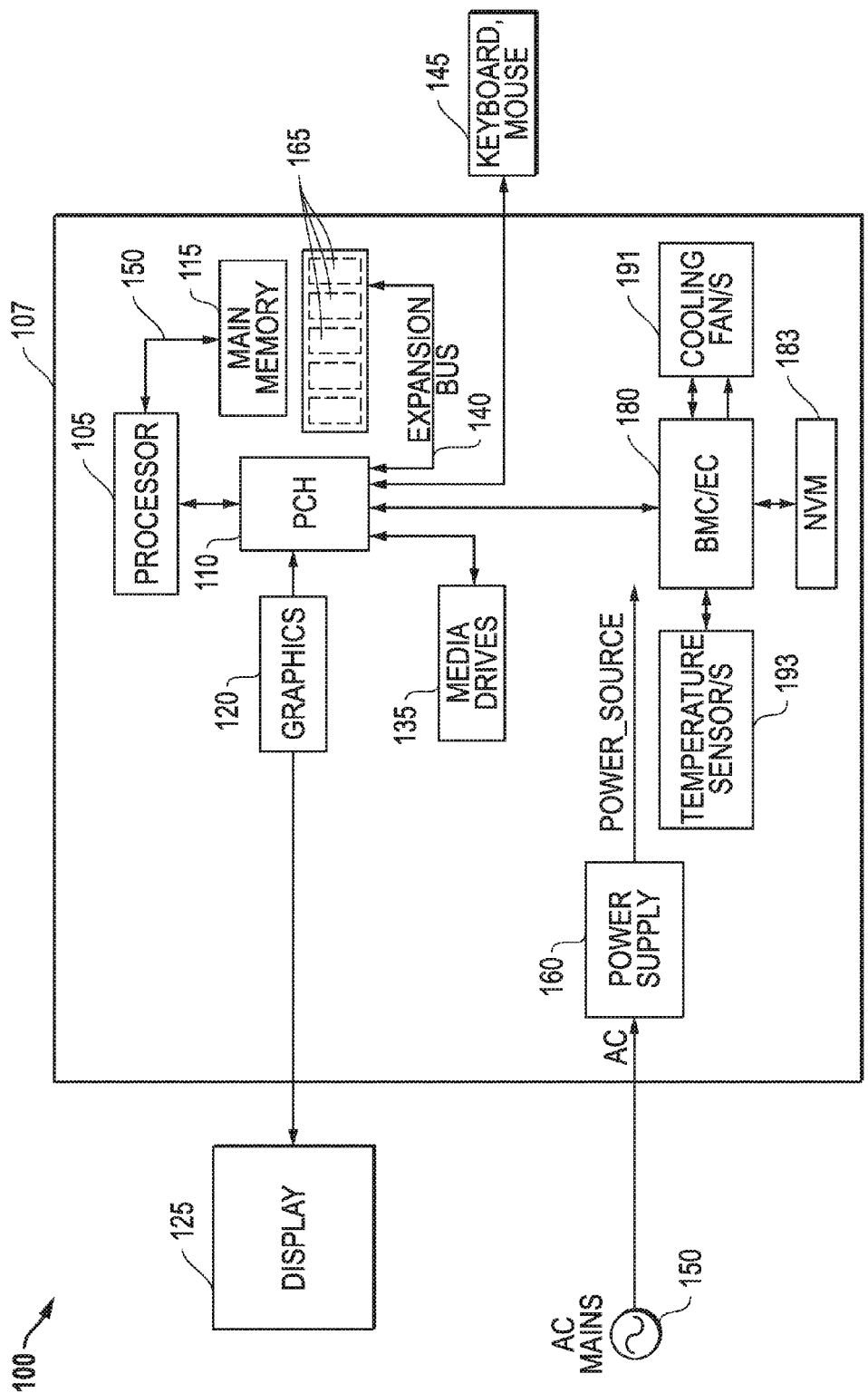
FIG. 1 is a block diagram illustrating an information handling system according to one exemplary embodiment of the disclosed systems and methods.

FIG. 1 is a block diagram of one exemplary embodiment of an information handling system 100 (e.g., such as a desktop workstation computer, server, etc.) having various internal heat-generating components contained within a computer chassis enclosure 107. Chassis enclosure may be configured, for example, as a desktop computer tower enclosure, rack mount enclosure (e.g., 1U, 2U, . . . 5U, etc.) or any other enclosure that contains the internal components of information handling system 100 within enclosure walls. As described herein, the internal heat-generating components of information handling system 100 may be cooled by one or more controlled cooling fans disposed within the chassis enclosure 107. It will be understood that the configuration of FIG. 1 is exemplary only, and that the disclosed systems and methods may be implemented with any other type of information handling system that includes heat-generating components enclosed within a computer chassis, including a portable information handling system such as a notebook or laptop computer.

Moreover, where described herein with regard to control of cooling fan speed for particular embodiments, it will be understood that the disclosed systems and methods may be implemented in other embodiments to control any other type of variable speed or variable flow rate cooling device that circulates any other type of cooling fluid within an information handling system chassis, e.g., such as one or more electric motor driven liquid coolant pumps that circulate liquid coolant within the chassis of an information handling system in a closed coolant path loop provided within the chassis for each coolant pump together with one or more heat exchangers for cooling system components. For example, in one alternative embodiment, one or more cooling pumps may be controlled to cool information handling system components in a manner similar to the way one or more cooling fans are controlled to cool information handling system components. Thus, where specific terms are used herein to describe a cooling fan and cooling air embodiment (e.g., terms such as "fan speed", "fan speed control information", "fan speed modifier information", "cooling air", etc.) it will be understood that such terms may be used interchangeably with corresponding terms of "cooling device speed", "cooling speed control information", "cooling device speed modifier", "cooling fluid", etc. to refer to additional types or genus of cooling devices besides fans, and different types of coolant fluids besides air.

As shown in FIG. 1, information handling system 100 of this exemplary embodiment includes at least one host processing device 105 which may be a central processing unit (CPU) such as an Intel Pentium series processor, an Advanced Micro Devices (AMD) processor or other type of host processing device that executes an operating system (OS) for system 100, e.g., Intel x86 processor, AMD x86 processor, ARM core processor, or other types of host processing devices. Host processing device 105 may be provided in one embodiment with an integrated memory controller (iMC) to facilitate memory functions, although it will be understood that a memory controller may be alternatively provided as a separate chip or other circuit in other embodiments. Still referring to the exemplary embodiment of FIG. 1, main system memory 115 (e.g., DRAM) may be coupled via DDR channel 150 as shown to host processing device 105. As shown, an external display 125 (e.g., LCD or LED display, touchscreen, or other suitable display device) may be coupled to an optional graphics processing unit (GPU) 120 to provide visual images (e.g., via displayed interactive graphical user interface) to the user. GPU 120 is in turn coupled to host processing device 105 via platform controller hub (PCH) 110 which facilitates input/output functions for the information handling system 100. It will be understood that functions of GPU 105 may alternatively or additionally be integrated within the host processing device 105 and/or that other types of graphics processing devices may be present, e.g., graphics-derivative processors such as physics/gaming processors.

Still referring to FIG. 1, local system storage 135 (e.g., one or media drives such as hard disk drive/s, optical drives, NVRAM devices, Flash devices or any other suitable form of internal or external storage) may be coupled to PCH 110 and its controller chip to provide permanent storage for the information handling system 100. External input devices 145 (e.g., such as a keyboard, mouse, touchpad, touchscreen etc.) may be coupled as shown to PCH 110 and its controller chip to enable the user to interact with the information handling system 100 and programs or other software/firmware executing thereon. An expansion bus 140 may be coupled to PCH 110 to provide the information handling system 100 with plug-in functionality for additional heat-generating components 165, such as PCI cards or other types of plug-in components. Expansion bus 140 may be, for example, a PCI bus, PCI Express bus, SATA bus, USB or any other suitable expansion bus. Information handling system 100 of FIG. 1 also includes at least one power supply component 160 that is coupled to a source of AC power, namely AC mains 150. Power supply 160 may receive AC mains current and produce a regulated DC power source for the various components of system 100 perform power supply functions such as AC to DC conversion and voltage regulation. In alternative embodiments, a system on chip ("SOC") or other type of integrated circuit may be employed that consolidates one or more of memory controller, CPU, GFX, PCI devices and other I/O into a single integrated chip.

As further shown in FIG. 1, one or more variable speed cooling fans 191 may be provided to cool various heat-generating components within chassis enclosure 107. In this regard, it is possible that cooling fan/s 191 may be present in one or more locations to circulate air through one or more areas of enclosure 107 for purposes of cooling multiple heat-generating components within enclosure 105, and/or that one or more individual cooling fan/s 191 may be configured to each cool a particular designated heat-generating component (e.g., such as processor 105, main memory 115, PCH 110, media drives 135, GPU 120, PCI cards or other expansion devices 165, power supply 160, etc.). As previously described, in alternative embodiments other types of cooling devices (e.g., such as variable speed cooling pumps) may be substituted for cooling fans 191 or supplement cooling fans 191, and be controlled in a similar manner. Also shown present are one or more temperature sensors 193 that may be configured to sense operating air temperature within one or more areas or locations of chassis enclosure 107 (e.g., such as ambient temperature at the air inlet of chassis enclosure 107) and/or that may be configured to sense temperature of particular individual heat-generating components, such as processor 105, main memory 115, PCH 110, media drives 135, GPU 120, PCI cards or other expansion devices 165, power supply 160, etc.

In the illustrated embodiment, an out-of-band processing device 180 (e.g., baseboard management controller (BMC), service processor, embedded processor, embedded controller (EC) remote access controller, etc.) may be coupled to PCH 110 and provided with persistent storage/non-volatile memory 183, although an out-of-band processing device with integrated persistent storage may also be employed. As described further herein, processing device 180 and persistent storage 183 may be together configured to control fan speed of one or more cooling fans 191 based on real time system temperatures that are sensed by one or more temperature sensor/s 193, e.g., such as internal chassis air temperature, temperature/s of individual internal hardware components, etc. In this regard, a given thermal or temperature sensor 192 may be configured to sense the real time temperature of a corresponding individual hardware component and report this sensed temperature to out of band processing device 180 across a suitable data bus or other suitable communication media, e.g., continuously or at predetermined time intervals that may be unique for each component. One or more chassis temperature sensors 192 may alternatively or additionally be provided to monitor internal chassis temperatures at one or more different locations within chassis enclosure 107 (e.g., such as ambient temperature at the air inlet of the chassis 107) and report this sensed temperature to out of band processing device 180 across a suitable data bus or other suitable communication media, e.g., continuously or at suitable predetermined time intervals.

As shown in FIG. 1, out-of-band processing device 180 is a separate and independent processing device from any in-band host central processing unit (CPU) such as host processing device 105 that runs the host OS of an information handling system 100. In this regard, out-of-band processing device 180 may operate without management of any application executing with a host OS on the host CPU. In this exemplary embodiment, persistent storage 183 may contain stored cooling device speed control information in the form of fan speed control information that is accessible by out of band processing device 180, as well as firmware or other programming that is used by out of band processing device 180 to implement the disclosed user-configurable cooling fan speed response modification of the embodiments described herein.

Besides the particular embodiment of FIG. 1, it will be understood that the disclosed user-configurable cooling fan speed response modification may be implemented in other embodiments using any other type and/or combination of out-of-band processing devices and/or in-band processing devices (e.g., such as host processing device 105) together with persistent storage that is suitable for implementing one or more cooling fan speed response modification features described herein. Moreover, it also possible that the disclosed user-configurable cooling fan speed response modification may be implemented with other types of information handling system configurations including portable information handling systems, such as notebook or laptop computers. For example, an embedded controller (EC) of a notebook or laptop computer may in one exemplary embodiment be configured to accept user-configurable fan speed modifications to how one or more individual system cooling fan/s respond to fan speed control values specified by fan speed control information stored in coupled persistent storage of the notebook or laptop computer.

Still referring to FIG. 1, out of band processing device 180 may in one exemplary embodiment be configured to control operation of cooling device/s in the form of cooling fan/s 191 based on this stored thermal configuration information in combination with measured temperature information received by out of band processing device 180 from sensors 193, and with any cooling device speed modifier information input by a user via input devices 145 and/or GUI or touchscreen display 125 in the form of fan speed modifier information. Examples of stored fan speed control information include, but are not limited to, one or more linear curves of fan speed versus temperature for individual cooling fan/s 191 at given sensed system temperatures, one or more thermal tables that specify pre-defined fan speed values for individual cooling fan/s 191 at given discrete temperature ranges or zones with zone having an associated fan speed RPM value. Stored fan speed control information may also be provided in the form of multiple selectable USTT modes (or thermal policies) that each includes a different thermal table that specifies different pre-defined fans speed values for the same cooling fan/s 191 at the same sensed temperatures than is specified by the respective thermal tables of the other USTT modes. In the latter case, a user of information handling system 100 may select from among the different USTT modes. It will be understood that in other embodiments the disclosed systems and methods may be implemented without selectable USTT modes.

Table 1 below is one example of fan speed control information in the form of a thermal table specifying pre-defined fan speed values in RPM for individual cooling fan/s 191 to be used at given discrete sensed system temperature ranges or zones, e.g., such as may be employed to control cooling fans of a notebook computer. It will be understood that the number of cooling fans illustrated in Table 1 is exemplary and that a given system configuration may include a greater or lesser number of cooling fans. Example of fan speed control information in the form of a continuous temperature curve that may be employed (e.g., such as with a desktop computer implementation) is described and illustrated in relation to FIGS. 5-8 herein. It will be understood that similar forms of cooling device control information (e.g. thermal table, thermal curve) may be utilized to control speed of other types of cooling devices such as variable-speed cooling pumps.

Table 1 may be stored, for example, in persistent storage 183 (and optionally populated in volatile memory for run-time access) and used by out of band processing device 180 to control each of the designated cooling fans 191 of information handling system 100 based on sensed temperature range reported by corresponding temperature sensors 193, e.g., processing device 180 may access persistent storage 183 and look up the pre-defined fan speed value that corresponds to the real time temperature range sensed by a sensor 193 and then use this value to control the corresponding cooling fan 191. In Table 1, each of the cooling fans is identified by an individual heat-generating component (e.g., CPU1, CPU2, Memory1, etc.) that it is configured to cool within a given information handling system chassis enclosure. For each identified cooling fan in Table 1, a sensed temperature value may be the actual sensed temperature of the associated component (if available), or may be an operating air temperature sensed by a temperature sensor at a given location within the chassis enclosure. It will be understood that the RPM fan speed control values of Table 1 are exemplary only, and that any other suitable form of fan speed control value may be alternatively employed, e.g., such as pulse wave modulation (PWM) control signal value, etc. It will also be understood that the number and identity of the cooling fans listed in Table 1 is exemplary only, and that the disclosed systems and methods may be implemented for information handling systems having any number of one or more cooling fans that are configured for cooling any combination of alternative or additional heat-generating components.

TABLE 1

Thermal Table

| | Sensed Temperature Range (Degrees Celsius) | | | | |
|---|---|---|---|---|---|
| | 0-44 | 45-64 | 65-84 | 85-104 | 105-110 |
| CPU1 Fan (RPM) | 1000 | 2000 | 3000 | 4000 | 5000 |
| CPU2 Fan (RPM) | 1500 | 2250 | 3500 | 4250 | 5500 |
| Memory1 Fan (RPM) | 500 | 750 | 1000 | 1250 | 1500 |
| Memory2 Fan (RPM) | 650 | 850 | 1050 | 1300 | 1550 |
| PCI Slots Fan (RPM) | 1000 | 1500 | 2000 | 2500 | 3000 |
| HDD Fan (RPM) | 1000 | 1750 | 2500 | 3250 | 4000 |

In the practice of the disclosed systems and methods, any user interface configuration may be provided that is suitable for allowing a user to modify how one or more individual cooling fan/s of Table 1 respond at different temperatures to fan speed control information, such as the pre-defined thermal table of Table 1. For example, a user may be provided with a text box interface (e.g., on display 125) having one or more text boxes into which the user may directly enter user-configurable fan speed modifier information in the form of modifier values to modify the manner in which one more of the corresponding cooling fans of Table 1 respond to the pre-defined fan speed values. One example of a user-configurable fan speed modifier value is a multiplier factor that may be applied to (i.e., multiplied with) the pre-defined fan speed values of a given cooling fan to modify the given fan speed response. To illustrate, a user selected multiplier factor of 2.0 may be applied by a user to CPU1 Fan of Table 1 to double the actual response of CPU1 Fan speed to be 2000 RPM, 4000 RPM, 6000 RPM, 8000 RPM and 10000 RPM for the respective five pre-defined increasing temperature ranges of Table 1, but without changing the actual pre-defined fan speed values of the stored thermal table of Table 1. Moreover, in this embodiment only the response of the CPU1 Fan speed will be so modified, while the response of the other five cooling fans will not be modified unless the user enters a multiplier or other modifier for one or more of these other fans. It is noted that where an entered user-configurable fan speed modifier results in a fan speed response value at given temperature that is greater than the maximum fan speed for a given fan, the given fan will respond by operating at its maximum speed at such temperatures and will not exceed its maximum allowable speed regardless of how large the fan speed response value becomes.

Figure 2:
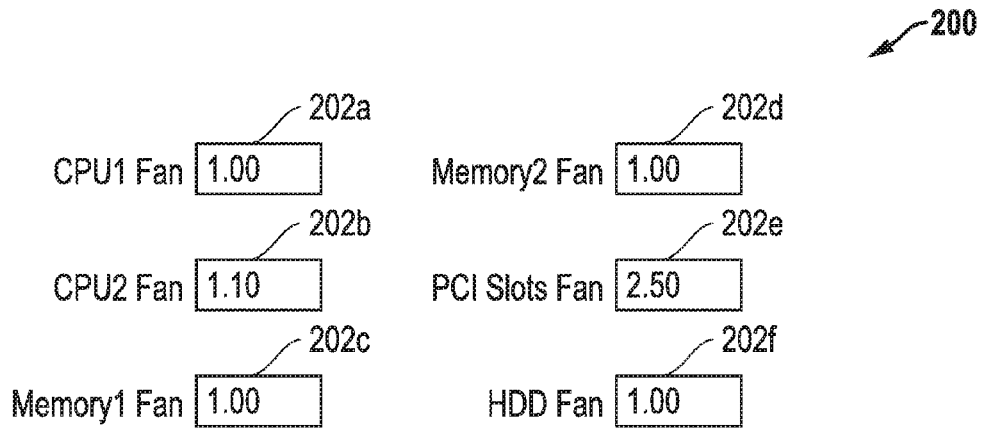
FIG. 2 illustrates a an entry box interface according to one exemplary embodiment of the disclosed systems and methods.

FIG. 2 illustrates one example of user interface 200 in which a text box is provided to allow a user to enter user-configurable fan speed modifier values for any one or more selected cooling fans of Table 1. In one exemplary embodiment, a user-configurable fan speed modifier may be a multiplier that is limited to values of greater than or equal to unity (≥1.0) so that a system user is not allowed to modify system fan speed response below the default baseline nominal thermal engineering fan speed values that are defined in the thermal tables, e.g., based on empirical laboratory thermal measurements of system cooling performance for a default (e.g., as manufactured) configuration of heat generating components within an information handling system chassis enclosure. This is illustrated in FIG. 2, where each of the text boxes 202 have a default minimum allowable value of 1.00. A maximum allowable value (e.g., such as 5.00) may also be specified if desired to limit the magnitude of the multiplier value that may be entered by a user. Thus, the values of text boxes 202 represent an array of six multiplier values for the six corresponding cooling fans of Table 1. In this exemplary embodiment, out-of-band processing device 180 may be configured to multiply each cooling fan location fan speed (RPM) determined by stored fan speed control information of Table 1 by its corresponding user-configured modifier value entered into one of text boxes 202. Regardless of any limit placed on the magnitude of the multiplier that may be entered by a user, a PWM limit (e.g., 0xff/255) may remain in place to cap the PWM and resulting cooling fan speed at its pre-defined maximum.

As shown in FIG. 2, a user-entered fan speed value multiplier of 1.10 for the CPU2 Fan of Table 1 would cause the CPU2 Fan to respond to a given sensed temperature by running 10% faster than the nominal speed specified by the pre-defined thermal tables. Similarly, a fan speed value multiplier of 2.50 entered for the PCISlots Fan of Table 1 would cause the PCISlots Fan to run 2.5 times faster than the nominal speed specified by the pre-defined thermal tables, and to respond to increasing sensed temperatures by reaching its maximum fan speed two and a half times faster than it would otherwise reach the maximum fan speed based solely on the non-modified fan speed values that are defined in the thermal table. Precision granularity of user-configurable multiplier values may vary as desired to fit given applications. For example, in one exemplary embodiment two decimal place multiplier values may be employed, however floating point precision may be set to any number of digits past the decimal point.

In another possible alternative embodiment, a single text entry box may be provided for entering a fan speed value multiplier together with multiple check boxes that correspond to each of the different system cooling fans. A user may then select one or more of the cooling fans using the check boxes, and enter a single fan speed value multiplier in the text entry box. This single fan speed value multiplier will then be applied to modify the response of each of the user-configured cooling fans (as indicated by the user-checked boxes) by multiplying each selected fan's pre-defined nominal speed by the multiplier at any given sensed temperature. In yet another embodiment, a single fan speed value multiplier may be entered by a user as described above without selecting any particular cooling fans, and then applied to modify the response of all system cooling fans by multiplying the pre-defined nominal speed of every fan by the entered multiplier at any given sensed temperature. In yet another alternative embodiment, a single fan speed value multiplier may be entered by a user as described above without selecting any particular cooling fans, and an algorithm then implemented (e.g., on out-of-band processing device 180) to automatically select the cooling fan designated to be controlled by the most aggressive stored fan speed control information (e.g., having the highest pre-defined stored fan speed/s) and then apply the user-configured fan speed value multiplier to modify the response of only the selected cooling fans that have been previously designated to be controlled based on the most aggressive stored fan speed control information. These particular above-described alternative single fan speed value multiplier embodiments may also be implemented with any of the user-configurable fan speed modifier value embodiments of FIGS. 3-8 described below.

Figure 3:
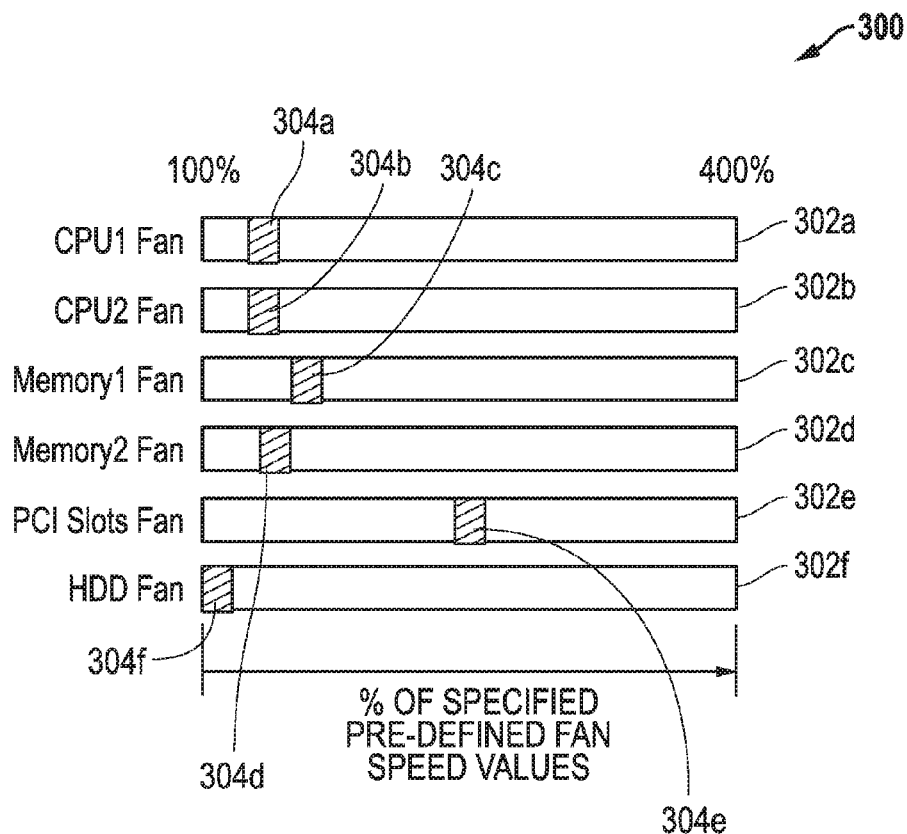
FIG. 3 illustrates a graphical user interface including sliders for each fan position according to one exemplary embodiment of the disclosed systems and methods.

FIG. 3 illustrates another exemplary embodiment of a GUI slider interface 300 that may be displayed to allow a user to enter user-configurable fan speed modifier information in the form of percentage multiplier values for any one or more selected cooling fans of Table 1, e.g., using a mouse pointer or touch pad. In this exemplary embodiment, fan speed response for each of system cooling fans of Table 1 may be individually modified by a user by moving a corresponding slider 304 along the respective slider scale 302 for the given cooling fan. As shown in FIG. 3, the possible user-configurable fan speed modifier values for each fan range from a minimum of 100% (no modification to the specified pre-defined baseline nominal fan speed value) up to a maximum of 400% (the specified pre-defined baseline nominal fan speed value is increased by four times), with precision granularity between these two points be limited only by the precision desired for a given application. As shown in FIG. 3, the response of each of the cooling fans may be individually modified by a different amount, i.e., HDD Fan is shown non-modified while PCI Slots Fan is modified by about 200%, with other fans being modified by respective values therebetween.

FIGS. 4-8 illustrate another exemplary embodiment of a GUI adjustable thermal curve interface 400 that may be displayed (e.g., on display 125 of information handling system 100) to allow a user to enter user-configurable fan speed modifier information by manipulating cooling fan response curves for any one or more selected cooling fans of a given system, e.g., using a mouse pointer or touch pad. In this regard, a separate GUI adjustable thermal curve interface 400 may be provide for each system cooling fan and/or a single GUI adjustable thermal curve interface 400 may be provided for controlling multiple system cooling fans. In one exemplary embodiment, it is possible that multiple such GUI adjustable curve interfaces 400 may be provided and displayed for a given single fan location as shown in FIG. 4B, with each different interface 400 having a thermal curve that specifies a different pre-defined relationship between fan speed and sensed temperature for the given fan location. In such an embodiment, a user may not only be allowed to select any given one of the pre-defined thermal curves for controlling the speed of a given cooling fan, but may also be allowed to configure that selected thermal curve in various ways such as described further below in relation to the individual GUI adjustable curve interface 400 of FIG. 4A.

Figure 4A:
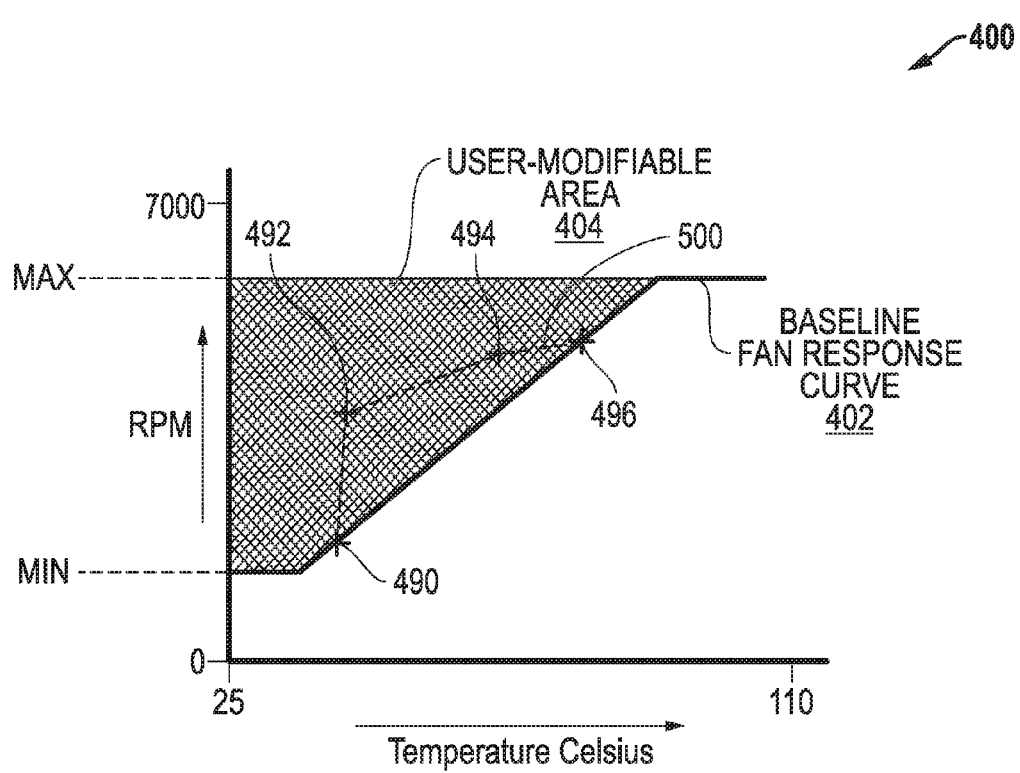
FIG. 4A illustrates a specified pre-defined baseline nominal fan response curve and user modifiable area according to one exemplary embodiment of the disclosed systems and methods.
Figure 4B:
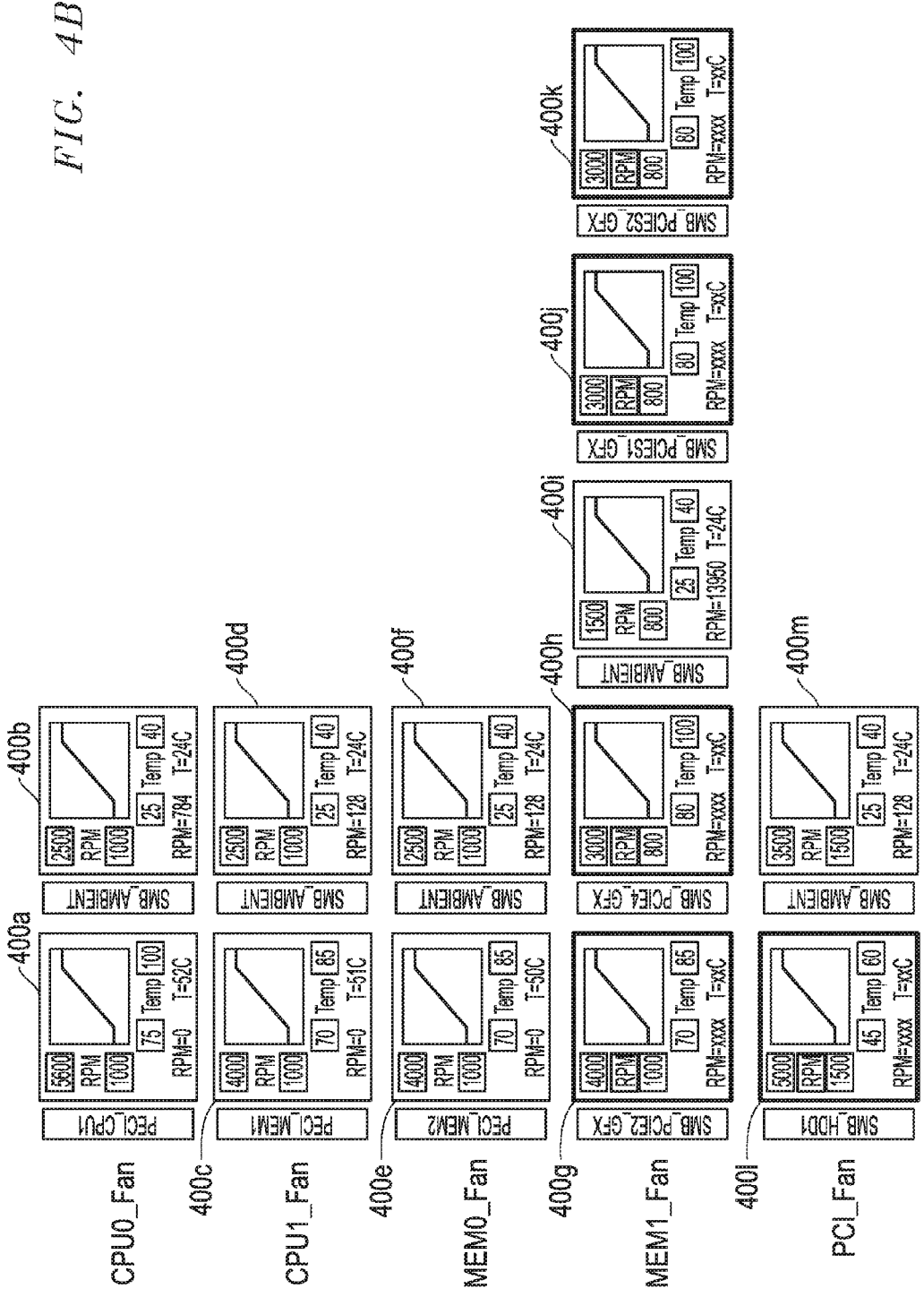
FIG. 4B illustrates multiple pre-defined baseline nominal fan response curves with respective user modifiable areas according to one exemplary embodiment of the disclosed systems and methods.

FIG. 4A illustrates a specified pre-defined baseline nominal fan response curve 402 as it may be defined between minimum fan cooling speed (e.g., about 1500 RPM at 0% PWM) at a sensed temperature of about 25° C. and a maximum fan cooling speed (e.g., about 5500 RPM at 100%

PWM) at a sensed temperature of about 95° C. and above. Each x-y coordinate of fan response curve 402 represents a pre-defined (default) fan speed value at a given sensed temperature. Such a baseline nominal fan response curve 402 may be defined, for example, based on empirical laboratory thermal measurements of system cooling performance for a default (e.g., as manufactured) configuration of heat generating components within an information handling system chassis enclosure. Also shown in FIG. 4A is a user modifiable area 404 defined between the baseline fan response curve 402 and the maximum possible cooling fan speed. As illustrated, the user modifiable area 400 does not include fan speeds that are below the baseline nominal fan response curve 402, so that cooling fan response speed cannot be modified by a user to be below this curve at any given sensed temperature. It will be understood that each of the multiple GUI adjustable curve interfaces 400a-400m of FIG. 4B may also include a respective user modifiable area defined between the baseline fan response curve and the maximum possible cooling fan speed in the same manner as illustrated for the individual GUI adjustable curve interface 400 of FIG. 4A.

It will be understood that the particular shape (e.g., number and slope of linear segments) of baseline nominal fan response curve 402 of FIG. 4 is exemplary only, and that any other fan response curve shape and/or position on the x-y axis is possible depending on the particular thermal characteristics and requirements of given hardware components/s to which the fan response curve corresponds, e.g., including fan speed response curve shapes having a greater or fewer number of linear segments of differing slope, curve shapes including one or more curved (non-linear) segments, curve shapes that reach maximum RPM at relatively lower or higher temperatures depending on hardware characteristics, etc. As a further example, a baseline nominal fan response curve of 0 may alternatively intersect 0 RPM for a notebook computer configuration.

Figure 5:
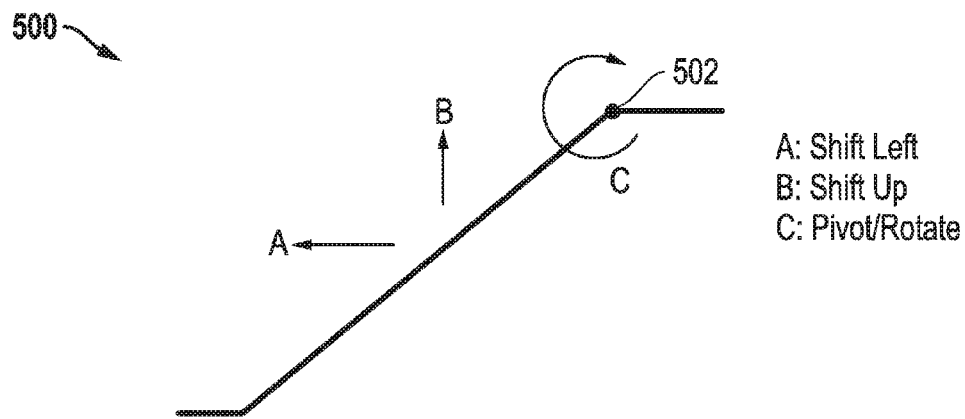
FIG. 5 illustrates a user-manipulable modified cooling fan response curve according to one exemplary embodiment of the disclosed systems and methods.

Referring to FIG. 5, a user may be allowed to manipulate a modified cooling fan response curve 500 having the same shape (but different x-y orientation) as the baseline response curve 402 within the user modifiable area 404 in any direction that does not result in a modified cooling fan speed response that is below the baseline fan response curve 402 at any given sensed temperature. For example, as shown in FIG. 5, in one exemplary embodiment a user may be allowed to shift the modified cooling fan response curve 500 to the right into area 404 in the "A" direction, to shift the modified cooling fan response curve 500 upwards into area 404 in the "B" direction, and/or pivot or rotate the modified cooling fan response curve 500 about any user-selected point on curve 502 into area 404 in the "C" direction (or in the reverse direction). Moreover, in another exemplary embodiment a user may be allowed to define one or more additional points within area 404 as shown to produce a modified cooling fan response curve 500 that includes the added points, e.g., as illustrated by user-defined points 490, 492, 494 and 496 in FIG. 4A.

Figure 6:
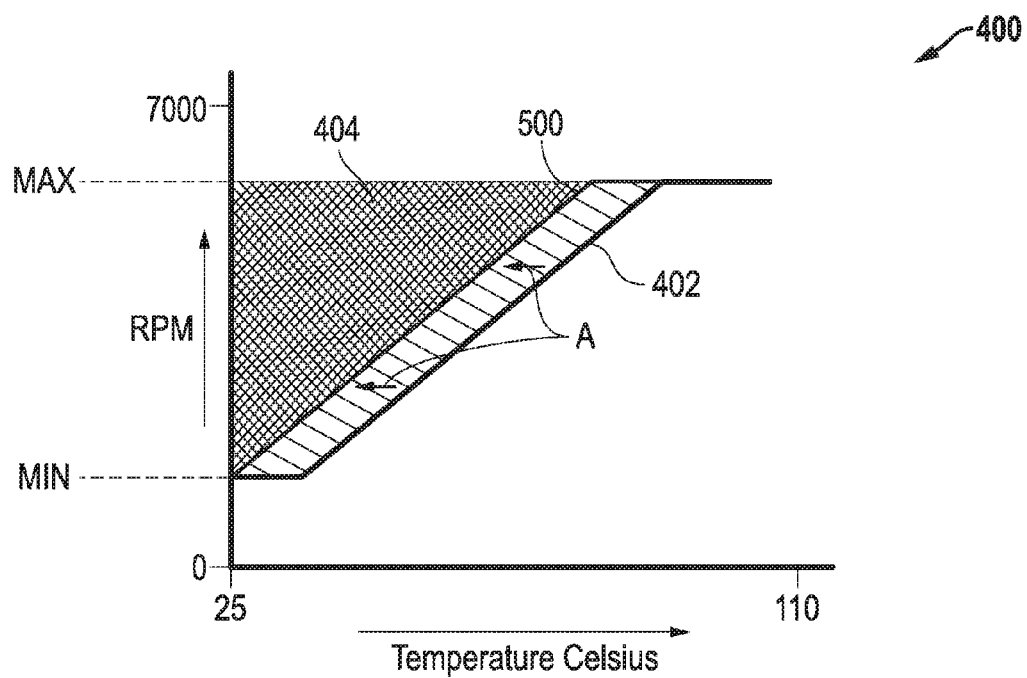
FIG. 6 illustrates a user-manipulable modified cooling fan response curve according to one exemplary embodiment of the disclosed systems and methods.
Figure 7:
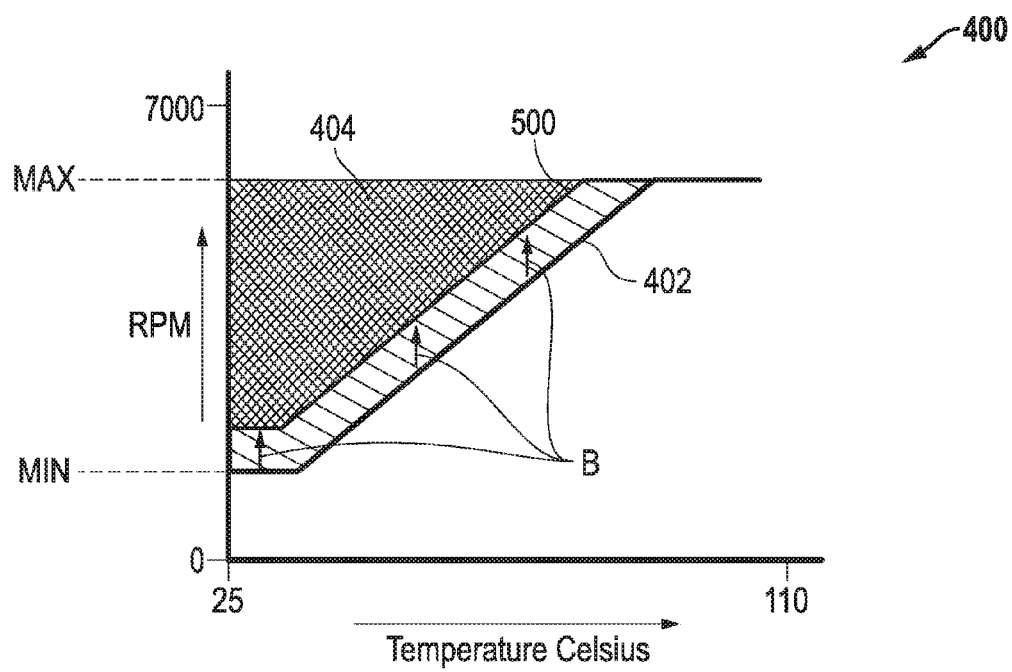
FIG. 7 illustrates a user-manipulable modified cooling fan response curve according to one exemplary embodiment of the disclosed systems and methods.
Figure 8:
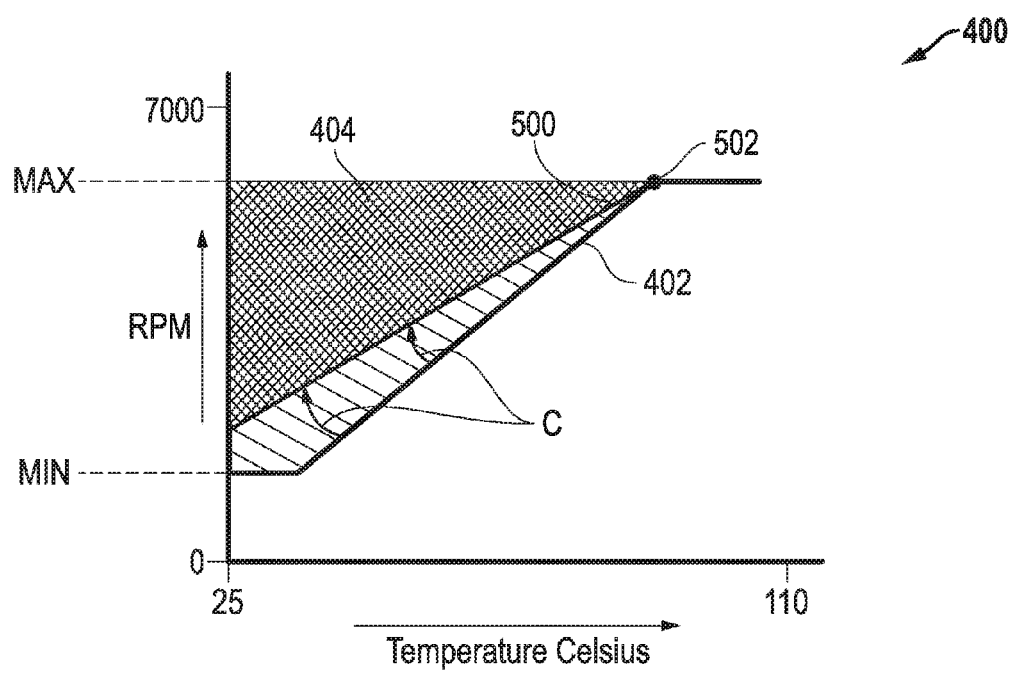
FIG. 8 illustrates a user-manipulable modified cooling fan response curve according to one exemplary embodiment of the disclosed systems and methods.

As shown in FIGS. 6-8, cooling fan response curve 500 may be so manipulated (e.g., with mouse or touchpad pointer) using mouse, touchpad and/or keyboard commands to shift the modified cooling fan response curve 500 to the left with "A" motion as illustrated in FIG. 6, shift the modified cooling fan response curve 500 upwards with "B" as illustrated in FIG. 7, and/or to rotate the modified response curve 500 in a clockwise direction around a user-selected pivot point 502 with "C" motion as illustrated in FIG. 8. Each resulting x-y coordinate of the modified cooling fan response curve 500 represents a modified fan speed response value at a given sensed temperature. In this embodiment, cooling fan response curve 500 may be manipulated to cause the out-of-band processing device 180 to vary the cooling fan response to changing temperature based on thermal configuration information (e.g., such as thermal table values) stored in persistent storage/non-volatile memory 183, but without changing the stored thermal configuration information stored in persistent storage/non-volatile memory 183 (e.g., without changing the actual pre-defined stored fan speed values of stored thermal table/s).

In the practice of the disclosed systems and methods, an information handling system user may be given the opportunity to enter user-configurable fan speed modifier information using any suitable out-of-band and/or in-band session technique. In one exemplary embodiment out-of-band processing device 180 may be configured to provide the user the opportunity to enter any desired user-configurable fan speed modifier values using a BIOS setup page and setup fields during system boot of information handling system 100. In such an embodiment, a user may enter a specified keystroke during system boot that causes processing device 180 to display a suitable user interface for entry of user-configurable fan speed modifier information (e.g., such as one or more of the interfaces described and illustrated with respect to FIGS. 2-8 herein). Thereafter, the user-configured fan speed modifier information may be used by processing device 180 to accordingly modify cooling fan response throughout the remainder of the current system in-band operating session.

The user-configured fan speed modifier information and/or user-modified fan speed information (e.g., user-modified tables, user-modified curves, etc.) may be optionally discarded after the end of each in-band operating session (e.g., at system shut down), or alternatively may be retained in persistent storage 183 or other non-volatile memory for use in subsequent operating sessions until again modified by a user during a subsequent boot session. In alternative embodiment, a user may be allowed to enter user-configurable fan speed modifier information during an in-band operating session, i.e., after system boot up. A user may wish the user-configured fan speed modifier information to be retained in persistent storage, for example, when the user has selected the modifier information due to a change in hardware configuration, such as addition or removal of PCI cards. In one exemplary embodiment, initial pre-defined values of a thermal table or pre-defined shape of a thermal curve may be maintained in persistent storage as baseline fan speed control information, and a user-changeable or manipulable version of the fan speed information may be maintained in volatile memory (e.g., RAM), which may be edited by a user using a presented GUI (e.g., with mouse or touchpad pointer) to edit the shape of the curve or mathematically via a "multiplier" or other modifier entered as text by the user.

It will be understood that one or more of the tasks, functions, or methodologies described herein may be implemented, for example, as firmware or other computer program of instructions embodied in a non-transitory tangible computer readable medium that is executed by a CPU, controller, microcontroller, processor, microprocessor, FPGA, ASIC, or other suitable processing device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a chassis enclosure;
   one or more heat generating components contained within the chassis enclosure;
   one or more temperature sensors configured to sense at least one of fluid temperature within the chassis enclosure, temperature of at least one of the heat generating components, or a combination thereof;
   one or more variable speed cooling devices configured to provide different flow rates of cooling fluid within the chassis enclosure to cool the heat generating components;
   persistent storage including device speed control information stored thereon, the device speed control information representing a pre-defined relationship between device speed control values and the sensed temperature reported by at least one of the temperature sensors; and
   at least one processing device configured to receive values of sensed temperature from each of the temperature sensors, and to provide control signals to control device speed of each of the cooling devices;
   where the processing device is configured to access the device speed control information stored on the persistent storage and to control device speed response of each of the cooling devices based on the pre-defined relationship between values of cooling device speed and the current sensed temperature defined by the device speed control information; and
   where the processing device is further configured to receive user-configurable device speed modifier information entered by a user of the information handling system, and
   to execute to modify the device speed response of each of the cooling devices to the device speed control values specified by the stored device speed control information based on the user-configurable device speed modifier information by applying the user-configurable device speed modifier information to the stored device speed control values specified by the stored device speed control information at the current sensed temperature without changing the pre-defined relationship between values of cooling device speed and the current sensed temperature defined by the device speed control information.

2. The information handling system of claim 1, further comprising multiple variable speed cooling devices configured to provide respective flow rates of cooling fluid within the chassis enclosure to cool the heat generating components; and where the processing device is further configured to:
   receive user-configurable device speed modifier information entered by the user for one or more selected individual cooling devices, with no user-configurable device speed modifier information being entered for a remaining one or more non-selected individual cooling devices; and
   modify only the device speed response of each of the selected one or more cooling devices to the device speed control values specified by the stored device speed control information based on the user-configurable device speed modifier information entered by the user for the selected cooling device by applying the separate user-configurable device speed modifier information to the stored device speed control values specified for the one or more selected cooling devices by the stored device speed control information at the current sensed temperature while at the same time not modifying the device speed response of each of the one or more non-selected cooling devices to the device speed control values specified by the stored device speed control information.

3. The information handling system of claim 1, where the cooling devices each comprise a cooling fan; and where the stored device speed control information comprises at least one of a thermal table or a thermal curve.

4. The information handling system of claim 1, where the user-configurable device speed modifier information comprises a user-configurable device speed multiplier value entered by a user; and where the processing device is configured to modify the device speed response of each of the cooling devices to the device speed control values specified by the stored device speed control information by multiplying the user-configurable device speed multiplier value with stored device speed control values specified by the stored device speed control information at any given current sensed temperature value.

5. The information handling system of claim 1, further comprising multiple variable speed cooling devices configured to provide different flow rates of cooling fluid within the chassis enclosure to cool the heat generating components; and where the processing device is further configured to:
   receive different user-configurable device speed modifier information entered separately by the user for each individual cooling device; and
   separately and differently modify the device speed response of each given one of the multiple cooling devices to the device speed control values specified by the stored device speed control information based on the different user-configurable device speed modifier information entered by the user for the given cooling device by applying the separate and different user-configurable device speed modifier information to the stored device speed control values specified for the given cooling device by the stored device speed control information at the current sensed temperature.

6. The information handling system of claim 1, where the processing device is further configured to provide a user interface for the user, the user interface comprising at least one text entry box configured to allow the user to enter the user-configurable device speed modifier information as numerical text.

7. The information handling system of claim 1, where the processing device is further configured to provide a graphical user interface (GUI) for the user, the GUI comprising at least one of a manipulable GUI slider bar, manipulable GUI curve, or a combination thereof.

8. The information handling system of claim 1, where the processing device comprises an out-of-band processing device; and where out-of-band processing device is configured to receive the user-configurable device speed modifier information entered by the user of the information handling system during system boot of the information handling system.

9. A method for modifying cooling device response in an information handling system, comprising:
providing an information handling system comprising:
a chassis enclosure,
one or more heat generating components contained within the chassis enclosure,
one or more variable speed cooling devices configured to provide different flow rates of cooling fluid within the chassis enclosure to cool the heat generating components,
at least one processing device, and
persistent storage including device speed control information stored thereon, the device speed control information representing a pre-defined relationship between device speed control values and the sensed temperature reported by at least one of the temperature sensors;
sensing at least one of fluid temperature within the chassis enclosure, temperature of at least one of the heat generating components, or a combination thereof; and
using the at least one processing device to:
access the device speed control information stored on the persistent storage,
control device speed response of each of the cooling devices based on the pre-defined relationship between values of cooling device speed and the current sensed temperature defined by the device speed control information,
receive user-configurable device speed modifier information entered by a user of the information handling system, and
execute to modify the device speed response of each of the cooling devices to the device speed control values specified by the stored device speed control information based on the user-configurable device speed modifier information by applying the user-configurable device speed modifier information to the stored device speed control values specified by the stored device speed control information at the current sensed temperature without changing the pre-defined relationship between values of cooling device speed and the current sensed temperature defined by the device speed control information.

10. The method of claim 9, where the information handling system further comprises multiple variable speed cooling devices configured to provide respective flow rates of cooling fluid within the chassis enclosure to cool the heat generating components; and where the method further comprises using the processing device to:
receive user-configurable device speed modifier information entered by the user for one or more selected individual cooling devices, with no user-configurable device speed modifier information being entered for a remaining one or more non-selected individual cooling devices; and
modify only the device speed response of each of the selected one or more cooling devices to the device speed control values specified by the stored device speed control information based on the user-configurable device speed modifier information entered by the user for the selected cooling device by applying the separate user-configurable device speed modifier information to the stored device speed control values specified for the one or more selected cooling devices by the stored device speed control information at the current sensed temperature while at the same time not modifying the device speed response of each of the one or more non-selected cooling devices to the device speed control values specified by the stored device speed control information.

11. The method of claim 9, where the cooling devices each comprise a cooling fan; and where the stored device speed control information comprises at least one of a thermal table or a thermal curve.

12. The method of claim 9, where the user-configurable device speed modifier information comprises a user-configurable device speed multiplier value entered by a user; and where the method further comprises using the processing device to modify the device speed response of each of the cooling devices to the device speed control values specified by the stored device speed control information by multiplying the user-configurable device speed multiplier value with stored device speed control values specified by the stored device speed control information at any given current sensed temperature value.

13. The method of claim 9, where the information handling system further comprises multiple variable speed cooling devices configured to provide different flow rates of cooling fluid within the chassis enclosure to cool the heat generating components; and where the method further comprises using the processing device to:
receive different user-configurable device speed modifier information entered separately by the user for each individual cooling device; and
separately and differently modify the device speed response of each given one of the multiple cooling devices to the device speed control values specified by the stored device speed control information based on the different user-configurable device speed modifier information entered by the user for the given cooling device by applying the separate and different user-configurable device speed modifier information to the stored device speed control values specified for the given cooling device by the stored device speed control information at the current sensed temperature.

14. The method of claim 13, further comprising using the processing device to:
receive values of sensed temperature from a given single temperature sensor; and
separately and differently modify the device speed response of each given one of the multiple cooling devices to the device speed control values specified by the stored device speed control information based on the different user-configurable device speed modifier information entered by the user for the given cooling device by applying the separate and different user-configurable device speed modifier information to the stored device speed control values specified for the given cooling device by the stored device speed control information at the current sensed temperature received from the given single temperature sensor.

15. The method of claim 13, further comprising using the processing device to:
receive values of sensed temperature from multiple temperature sensors; and
separately and differently modify the device speed response of each given one of the multiple cooling devices to the device speed control values specified by the stored device speed control information based on the different user-configurable device speed modifier information entered by the user for the given cooling device by applying the separate and different user-configurable device speed modifier information to the stored device speed control values specified for the given cooling device by the stored device speed control information at the current sensed temperature received from the multiple temperature sensors;
where device speed response of each of the multiple cooling devices is modified based on a value of current sensed temperature received from a different temperature sensor.

16. The method of claim 9, further comprising using the processing device to:
provide a user interface for the user, the user interface comprising at least one text entry box configured to allow the user to enter the user-configurable device speed modifier information as numerical text; and
receive the user-configurable device speed modifier information entered into the text entry box by the user.

17. The method of claim 9, further comprising using the processing device to:
provide a graphical user interface (GUI) for the user, the GUI comprising at least one of a manipulable GUI slider bar, manipulable GUI curve, or a combination thereof; and
receive the user-configurable device speed modifier information entered by the user manipulating the GUI slider bar GUI slider bar, manipulable GUI curve, or a combination thereof.

18. The method of claim 9, where the stored device speed control information comprises a thermal curve; and where the method further comprises using the processing device to:
provide a graphical user interface (GUI) for the user, the GUI comprising a manipulable GUI curve that corresponds to the thermal curve; and
receive the user-configurable device speed modifier information entered by the user manipulating the manipulable GUI curve that corresponds to the thermal curve.

19. The method of claim 9, where the processing device comprises an out-of-band processing device; and further comprising using the out-of-band processing device to receive the user-configurable device speed modifier information entered by the user of the information handling system during system boot of the information handling system.

20. The method of claim 9, where the information handling system further comprises multiple cooling devices that are each previously designated to be controlled by the processing device based on a different respective stored device speed control information; and where the method further comprises using the processing device to:
compare the stored device speed control information for each of the multiple cooling devices;
select at least one of the multiple cooling devices that has been previously designated to be controlled based on the device speed control information having the highest device speed control value representing highest device speed of all the different respective stored device speed control information; and
then apply the user-configured device speed value multiplier to modify the response of only the selected cooling device.

* * * * *